United States Patent [19]

Kriozere

[11] 4,348,440
[45] Sep. 7, 1982

[54] PRESSURE SENSITIVE SEAL

[75] Inventor: Richard A. Kriozere, Highland Park, Ill.

[73] Assignee: Professional Tape Company, Inc., Burr Ridge, Ill.

[21] Appl. No.: 25,282

[22] Filed: Mar. 29, 1979

[51] Int. Cl.³ .......................... B32B 7/06; B32B 7/12
[52] U.S. Cl. ........................................ 428/41; 428/43; 428/121; 428/40; 229/62; 150/7
[58] Field of Search .............. 428/40, 41, 121; 150/7; 229/62

[56] References Cited

U.S. PATENT DOCUMENTS

| | | | |
|---|---|---|---|
| 2,093,975 | 9/1937 | Farmer | 229/62 |
| 2,093,979 | 9/1937 | Farmer | 229/62 |
| 2,098,258 | 11/1937 | Rowe | 229/62 |
| 4,004,362 | 1/1977 | Barbieri | 428/41 X |
| 4,068,120 | 1/1978 | Throckmorton et al. | 428/41 X |

Primary Examiner—George F. Lesmes
Assistant Examiner—Alexander S. Thomas
Attorney, Agent, or Firm—Kinzer, Plyer, Dorn & McEachran

[57] ABSTRACT

A pressure sensitive seal member for providing a complete adhesive-to-adhesive seal for the open end of a pouch includes a strip of face stock having a pressure sensitive adhesive on one face. There are two removable backing strips covering the adhesive and they are in edge contact along a generally longitudinal line. The face stock has a generally longitudinal fold perforation which is offset from the line of edge contact and is covered by one of the backing strips. When the seal member is applied, first one of the backing strips is removed with the fold perforation remaining covered. One side of the pouch open end is applied to the exposed adhesive surface. Subsequently, the other backing strip is removed exposing the fold perforation. The strip is folded and that portion of the adhesive covered surface on the opposite side of the fold and formerly covered by the backing strip is applied to the remaining side of the pouch. The face stock is adhesively secured to opposite sides of the pouch and there is adhesive-to-adhesive contact between portions of the face stock directly adjacent the pouch opening.

2 Claims, 4 Drawing Figures

PRESSURE SENSITIVE SEAL

SUMMARY OF THE INVENTION

The present invention relates to adhesive seal members and particularly such seal members which are used to close the open end of sterilized pouches.

One purpose of the invention is a seal member of the type described which is in strip form and has face stock covered by a pressure sensitive adhesive, which adhesive is covered by a pair of removable backing sheets or liners. The liners are in edge contact along a line which is offset from the fold perforation of the face stock.

Another purpose is a seal member of the type described which provides adhesive-to-adhesive integrity completely around the open end of the pouch to be sealed.

Another purpose is a pressure sensitive seal member of the type described which not only provides adhesive-to-adhesive integrity along the open end of the pouch, but also along its sides.

Another purpose is a simply constructed reliably operable pressure sensitive seal of the type described.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

The present invention relates to pressure sensitive seal members as particularly used in sealing the open end of sterilized pouches. The invention, however, has wider application. The seal member is provided in strip form, which strips may be individually cut prior to sale, or may be sold in a roll with tear-off perforations for various strip lengths or the seal member may be sold in a non-perforated roll so that the user merely cuts off the desired length of strip. Regardless of the marketing form, the invention is specifically directed to the makeup of the seal member itself.

It is essential in sealing sterilized pouches, for example those customarily used in hospital operating rooms or similar areas, that the seal be complete; that is, there be no possibility of contamination reaching the interior of the pouch after the pouch has been sterilized. To meet this requirement it is necessary that there be adhesive-to-adhesive contact around the open end of the pouch. With such contact, it is insured that no contamination will reach the pouch interior.

In addition, the seal must be easily and quickly applied. Otherwise, there is a tendency to not provide the necessary complete seal described above.

Figure 1:
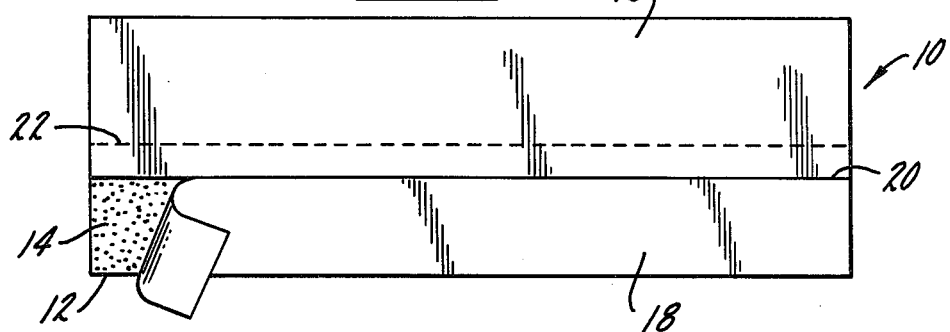
FIG. 1 is a plan view of the pressure sensitive seal member.

In FIG. 1 a seal member is indicated generally at 10 and includes a lower layer, commonly designated by the trade as the "face stock" and indicated at 12. Face stock 12 may have one side or face 14 covered by a pressure sensitive adhesive which may be one of a number of products commonly used for this purpose and readily available on the market. Adhesive face 14 is covered by two liners or backing strips indicated at 16 and 18. Backing strips 16 and 18 are in edge contact along a line 20 which runs generally longitudinal of member 10.

Face stock 12 has a fold perforation 22 which is generally centrally located. The exact location of the fold perforation is not important, but what is significant is that the fold perforation 22 be spaced from parting line 20 of the backing strips. Thus, one of the backing strips may be removed and the fold perforation will not be exposed or uncovered.

Figure 2:
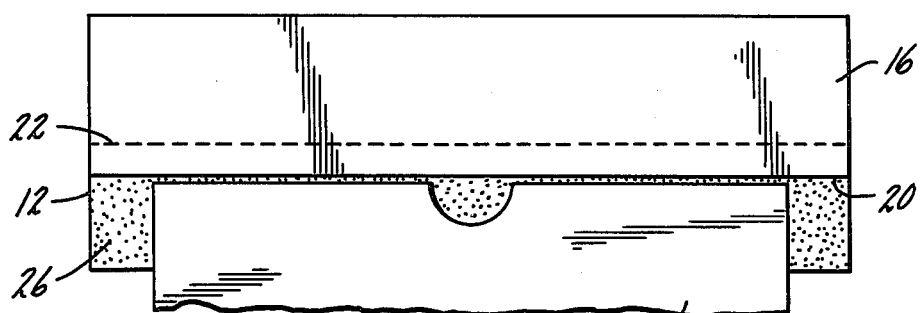
FIG. 2 is a similar plan view showing one of the backing strips removed and the seal member applied to the open end of the pouch.

In the application of the described seal member to a pouch, for example a pouch which may be used to contain a sterilized instrument, the first step is to peel off backing strip 18, as illustrated in FIG. 1. Once this has been done, then one side of the open end of a pouch 24 is applied to exposed area 26 formerly covered by backing strip 18, as in FIG. 2. Note that the end of the pouch is spaced from the fold perforation and that the side of the pouch applied to area 26 is in complete contact with adhesive.

Figure 3:
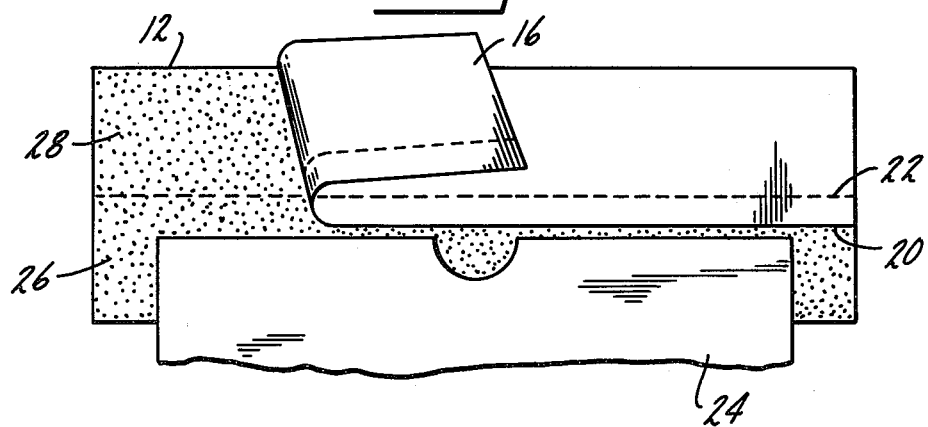
FIG. 3 is a similar plan view showing removal of the other backing strip.

The next step is to remove the other backing strip or backing strip 16, as illustrated in FIG. 3. When this is done, not only is the remaining area 28 of the face stock exposed, but the fold perforation is also exposed. The face stock is then folded along fold perforation 22 and that portion of the adhesive surface 28, on the side of the fold perforation away from the open end of the pouch, is then applied to the opposite side of the pouch. Thus, each side of the pouch adjacent the open end is in complete contact with an adhesive surface.

Figure 4:
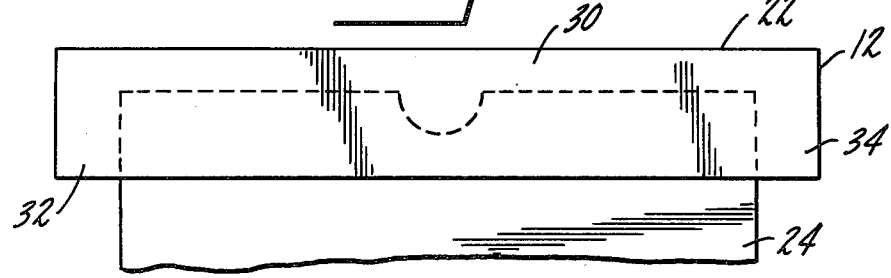
FIG. 4 is a plan view of the seal member completely applied to the open end of the pouch.

In addition, and of more significance, is the fact that when the face stock is folded upon itself there is adhesive-to-adhesive contact in the area 30 of FIG. 4. Because the fold perforation is offset from parting line 20 of the liners or backing strips when the face stock is folded upon itself there will be adhesive-to-adhesive contact between opposite portions of the face stock directly adjacent the open end of the pouch. In addition to the adhesive-to-adhesive integrity along the top of the open end of the pouch, areas 32 and 34 at opposite sides of the open end of the pouch will also have adhesive-to-adhesive integrity. This is because customarily the seal strip will be slightly longer than the open end of the pouch.

Because pouches of the type customarily sealed in the manner described and used for medical purposes will be of various sizes, the seal members may be marketed in different lengths or they may be marketed in the above-described rolls. What is important, however, is that the seal member have the fold-parting line relationship described above so that when the first backing strip is removed, the fold perforation is not exposed. In this way, when the second backing strip is removed, and the face stock is folded upon itself, there will necessarily be adhesive-to-adhesive integrity across the top of the open end of the pouch.

Whereas the preferred form of the invention has been shown and described herein, it should be realized that there may be many modifications, substitutions and alterations thereto.

The embodiments of the invention in which an exclusive property or privilege is claimed are defined as follows:

1. A pressure sensitive seal member for providing a complete adhesive-to-adhesive seal for the open end of a pouch including a strip of face stock having a pressure sensitive adhesive covering one face thereof, removable backing strips covering said adhesive face and being in edge contact along a generally longitudinal line, said face stock having a generally longitudinal fold perforation which is offset from the generally longitudinal edge contact line, said fold perforation being covered by one of said backing strips, when said seal member is applied, first the other of said backing strips is removed so that said fold perforation remains covered, one side of the pouch open end is applied to the exposed adhesive face, subsequently, the other backing strip is removed, exposing the fold perforation, the face stock is then folded at the fold perforation and that portion of the formerly covered adhesive face on the opposite side of the fold perforation is applied to the other side of the pouch open end whereby the open ends of the pouch each have an adhesive seal with the face stock and directly adjacent and along the pouch open end there is adhesive-to-adhesive contact between folded areas of the face stock, said strip having a length slightly greater than the open end of the pouch whereby there is also adhesive-to-adhesive contact between folded portions of the face stock at opposite sides of the pouch open end.

2. The pressure sensitive seal of claim 1 further characterized in that said fold perforation is generally centrally located on said strip.

* * * * *